United States Patent
Stojanovski

(12) 
(10) Patent No.: US 6,749,224 B1
(45) Date of Patent: Jun. 15, 2004

(54) ENERGY ABSORBING SEAT BELT ANCHOR

(76) Inventor: Stojan Stojanovski, 13300 W. Star Dr., Shelby Township, MI (US) 48315

( * ) Notice: Subject to any disclaimer, the term of this patent is extended or adjusted under 35 U.S.C. 154(b) by 0 days.

(21) Appl. No.: 10/166,792

(22) Filed: Jun. 11, 2002

(51) Int. Cl.[7] .............................................. B60R 22/20
(52) U.S. Cl. .................. 280/801.2; 280/801.1
(58) Field of Search .......................... 280/801.2, 801.1, 280/808, 101.1, 101.2

(56) References Cited

U.S. PATENT DOCUMENTS

| | | | |
|---|---|---|---|
| 5,529,344 A | | 6/1996 | Yasui et al. ................. 280/808 |
| 5,685,566 A | * | 11/1997 | Hirase et al. ............. 280/801.1 |
| 5,692,780 A | * | 12/1997 | Yasui ....................... 280/801.2 |
| 5,746,449 A | * | 5/1998 | Hiroshige .................... 280/808 |
| 5,779,270 A | * | 7/1998 | Tanaka ....................... 280/808 |
| 5,820,164 A | | 10/1998 | Patel et al. ................. 280/808 |
| 5,826,907 A | * | 10/1998 | Saito et al. ................. 280/808 |
| 5,863,069 A | * | 1/1999 | Wickenheiser et al. ...... 280/751 |
| 5,906,396 A | * | 5/1999 | Biller ....................... 280/801.2 |
| 5,941,567 A | | 8/1999 | Wickenheiser .............. 280/808 |
| 6,007,100 A | * | 12/1999 | Steffens, Jr. ............. 280/801.1 |
| 6,106,012 A | | 8/2000 | Boegge et al. ........... 280/801.1 |
| 6,244,626 B1 | * | 6/2001 | Monaghan et al. ......... 280/805 |
| 6,254,133 B1 | * | 7/2001 | Schmid ................... 280/801.1 |
| 6,364,359 B1 | * | 4/2002 | Dietrich ................... 280/801.2 |

* cited by examiner

*Primary Examiner*—Michael J. Carone
*Assistant Examiner*—Bret Hayes
(74) *Attorney, Agent, or Firm*—Charles W. Chandler

(57) ABSTRACT

An energy absorbing assembly for a vehicle seat belt anchor. Two energy-absorbing members are carried on a seat belt anchor mounting bolt that connects an adjusting rail to a body pillar. One energy-absorbing member, upon contact with an object that is suddenly moving toward the bolt is initially crushed until the object contacts the adjusting rail. A second shock-absorbing member is disposed between the adjusting rail and the body pillar to absorb a continued motion of the object toward the body pillar.

16 Claims, 6 Drawing Sheets

ENERGY ABSORBING SEAT BELT ANCHOR

BACKGROUND AND SUMMARY OF THE INVENTION

Automotive manufacturers cushion certain vehicle interior components, such as the seat belt anchors, near that portion of the vehicle where an occupant's head might impact the seat belt components.

Examples of prior art illustrating approaches to this problem, include U.S. Pat. No. 5,820,164 issued Oct. 13, 1998 to Rasik Patel and Francis Joseph Wickenheiser for "Energy Absorbing Seat Belt Component Fastener"; U.S. Pat. No. 6,106,012 issued Aug. 22, 2000 to Herbert Boegge et al. for "Deflection Fitting for Seat Belts of Vehicles"; U.S. Pat. No. 5,941,567 issued Aug. 24, 1999 to Francis J. Wickenheiser for "Head Impact Protection for an Automobile Seat Belt Anchor Fastener" and U.S. Pat. No. 5,529,344 issued Jun. 25, 1996 to Shinichi Yasui et al. for "Seat Belt Device for Automobile".

The broad purpose of the present invention is to provide an improved seat belt anchoring device for reducing head injuries in a vehicle. In the preferred embodiment of the invention, the seat belt anchoring device comprises an elongated vehicle rail having a belt anchoring ring mounted in a slot. The position of the ring can be vertically adjusted to accommodate the tautness of the belt for the passenger.

The rail is mounted on a pair of vertically spaced bolts attached to a body pillar. The length of the bolts is such that the rail can be moved from its normal operating position toward the body pillar. Shock-absorbing (cushioning) elements are mounted on the rail and the bolts. One form of shock absorbing element encloses each bolt connecting the rail to the body pillar. An object suddenly moving toward the bolt encounters the vehicle trim, then crushes or deforms the shock-absorbing element to absorb part of the energy of the moving object. A second shock-absorbing element is mounted between the rail and the body pillar to accommodate a continued motion of the moving object toward the body pillar. The rail moves toward the body pillar crushing walls of both shock-absorbing elements, thereby absorbing further energy.

This arrangement also accommodates a condition in which the moving object does not impact the bolt but instead moves directly toward the seat belt rail or ring. In this condition, the rail, in response to the impact, moves toward the body pillar crushing walls of both shock-absorbing elements.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
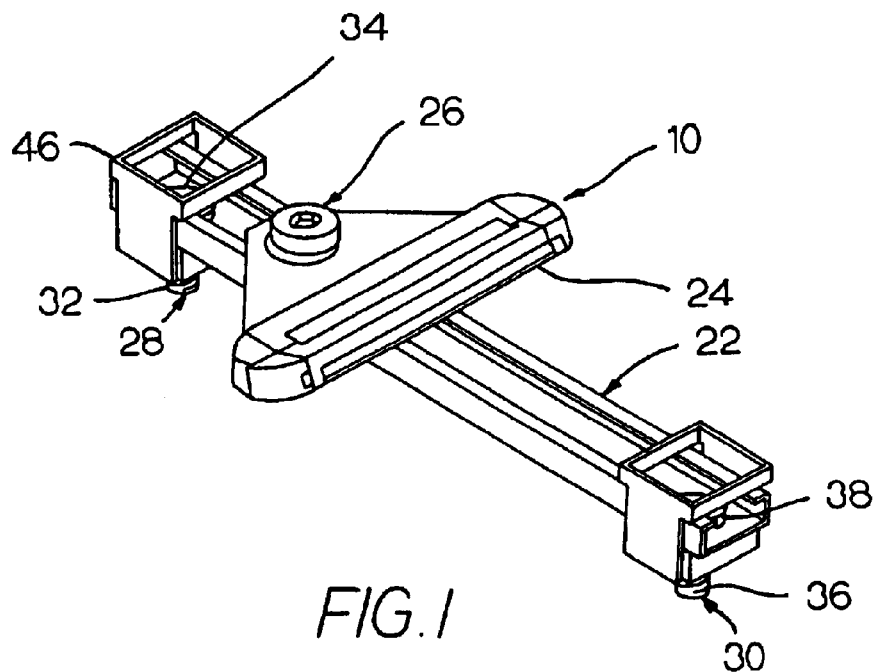
FIG. 1 is a view of an energy-absorbing seat belt anchoring device illustrating the preferred embodiment of the invention.
Figure 2:
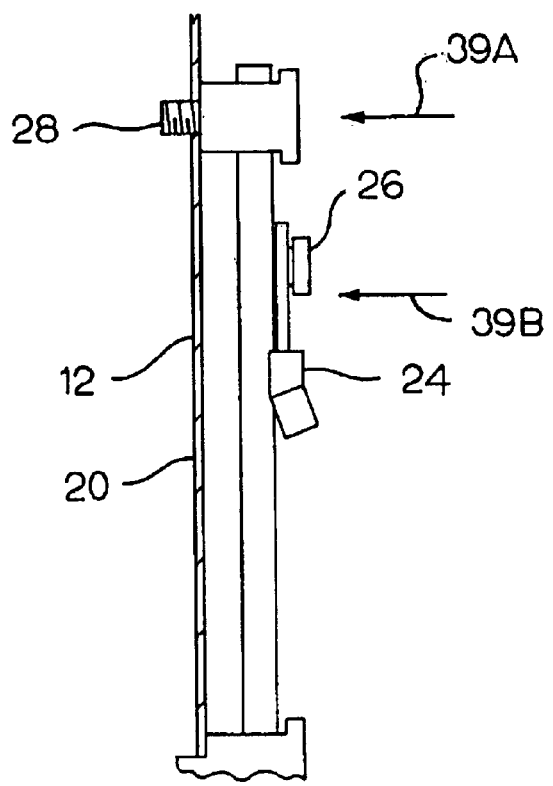
FIG. 2 is an elevational view of the anchoring device mounted on a vehicle body pillar, illustrated in section.
Figure 3:
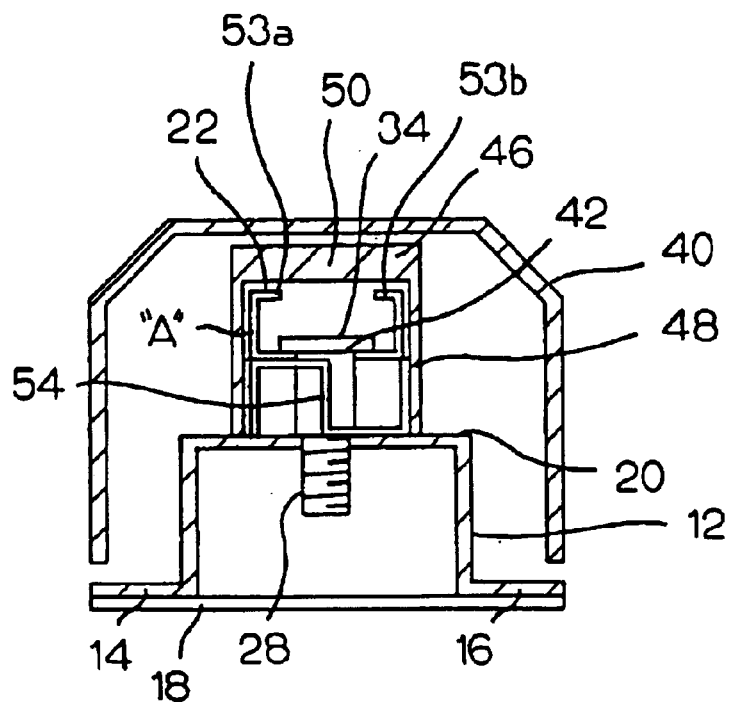
FIG. 3 is an enlarged sectional view of one of the bolts enclosed by the preferred shock-absorbing components.
Figure 4:
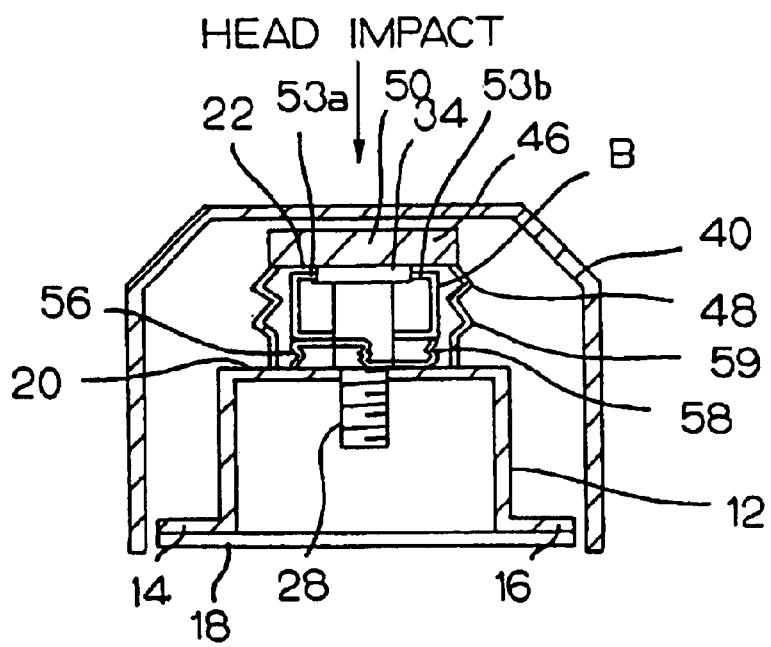
FIG. 4 is similar to FIG. 3 but shows the shock-absorbing device elements crushed under a head impact.

FIGS. 1 and 2 illustrate a preferred seat belt anchoring device 10 mounted on a flat panel section of a vehicle body pillar 12. Referring to FIGS. 3 and 4, body pillar 12 is channel-shaped with a pair of lips 14 and 16 rigidly connected to a portion of vehicle frame 18. Body pillar 12 has a relatively flat base wall 20.

The preferred seat belt anchor includes an elongated channel-shaped metal rail 22 supported on the pillar 12 in a vertical position. The rail 22 supports a seat belt anchoring ring 24. Anchoring ring 24 is fastened by fastening screw 26 to the rail 22 which permits ring 24 to be disposed in a desired vertical position along the length of the rail 22, using any of the commonly employed adjusting mechanisms, for example, such as illustrated in U.S. Pat. No. 6,106,012 to Herbert Boegge et al. A pair of bolts 28 and 30 fasten the rail 22 to body pillar 12. Bolt 28 has an elongated partially threaded shank 32 and a larger head 34. Similarly bolt 30 has an elongated partially threaded shank 36 and a head 38. The two bolts are identical and mounted in vertically spaced positions on the body pillar 12. The two bolts as well as the belt-supporting ring components provide an area for injuring a suddenly moving vehicle occupant such as in the direction of arrow 39A or arrow 39B as shown in FIG. 2.

Both bolts are enclosed by interior trim 40 as illustrated in FIGS. 3 and 4. A head impact will tend to move the interior trim toward the body pillar 12.

Referring to FIGS. 3 and 4, bolt 28 is threadably fastened to base wall 20 of the body pillar, in a relatively fixed position. The bolt shank extends through an opening 42 in the rail 12. Head 34 of the bolt is larger than the bolt opening. The rail 22 is movable along the shank of the bolt toward the body pillar from a position illustrated at "A" in FIG. 3 to a position illustrated at "B" in FIG. 4. An outer shock-absorbing member 46 encloses the head and part of the shank of bolt 28. Shock-absorbing member 46 has walls 48 that extend around the bolt 28 toward the body pillar. The shock-absorbing member 46 has a head 50 connected to walls 48.

Figure 6:
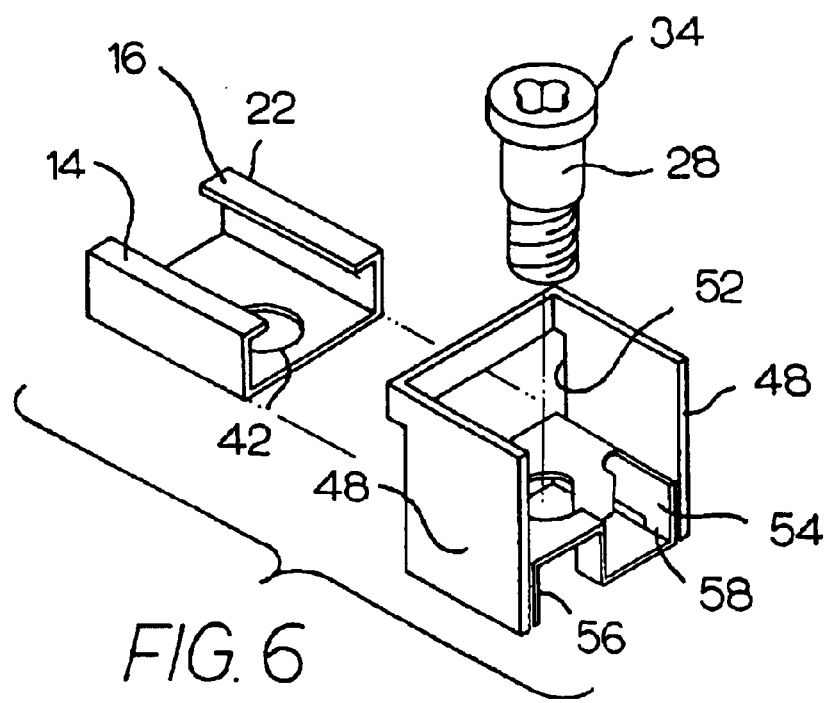
FIG. 6 is a blown-up view of the basic components of the preferred seat belt anchoring device.
Figure 7:
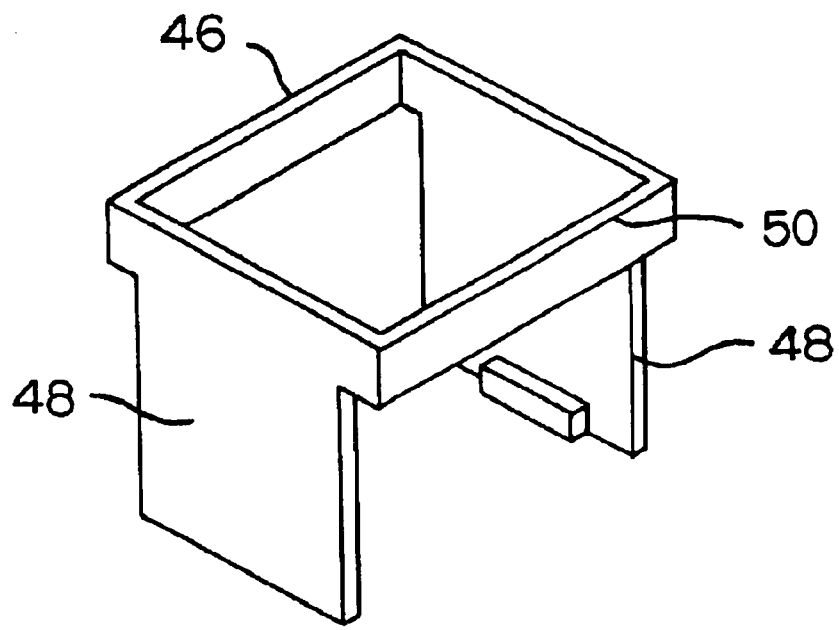
FIG. 7 illustrates the outer shock absorber.
Figure 8:
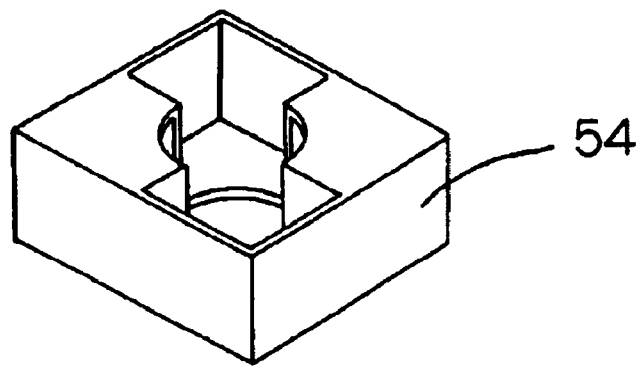
FIG. 8 illustrates the inner shock absorber.

FIG. 6 shows how the end of rail 22 extends through an opening 52 in the outer shock-absorbing member 46. Walls 48 of the outer shock-absorbing member are mounted perpendicular to pillar base wall 20, parallel to the longitudinal axis of the bolt 28. Head 50 of the outer shock-absorbing member 46 is spaced from the rail to permit the outer shock-absorbing member head to move toward the body pillar in a process in which walls 48 collapse or corrugate in a shock-absorbing manner, as illustrated in FIG. 4 at 59. Upper lips 53a and 53b of the rail are movable along the shank of the bolt 28 toward the body panel until the lips are flush with the top of the bolt head.

Figure 5:
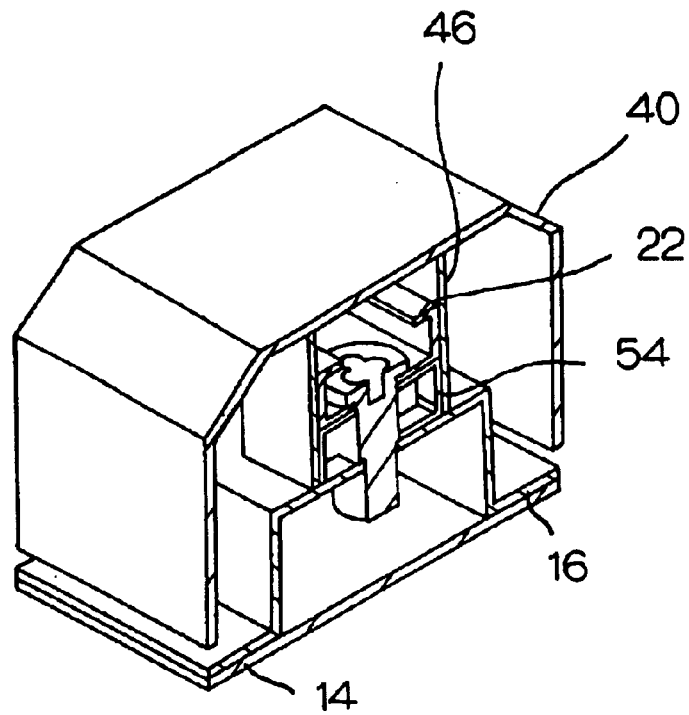
FIG. 5 is another perspective sectional view of the preferred embodiment in its undeformed condition.

A second or lower shock-absorbing member 54 is mounted between the bottom wall of the rail 22 and the body pillar 12. The lower shock-absorbing member 54 has a plurality of walls 56 as best shown in FIGS. 5 and 6 that are parallel to the walls of the outer shock-absorbing member 46. The lower shock-absorbing member has a wall 58 that engages the lower wall of the rail in such a manner that as the rail moves toward the body panel, walls 56 of the lower shock-absorbing member corrugate or crush in a shock-absorbing manner, as illustrated in FIG. 4.

Thus, a head impact on the trim of 40 toward the body pillar will initially cause the outer shock-absorbing member 46 to move toward the body panel in a shock-absorbing manner, and then, upon contacting the rail, push the rail 22 toward the body pillar 12. Thus initially the impact of the moving object striking the bolt end of the seat belt anchor will initially cushion the impact as it deforms the walls of the outer shock-absorbing member. The rail then crushes the walls of both shock-absorbing members.

Figure 9:
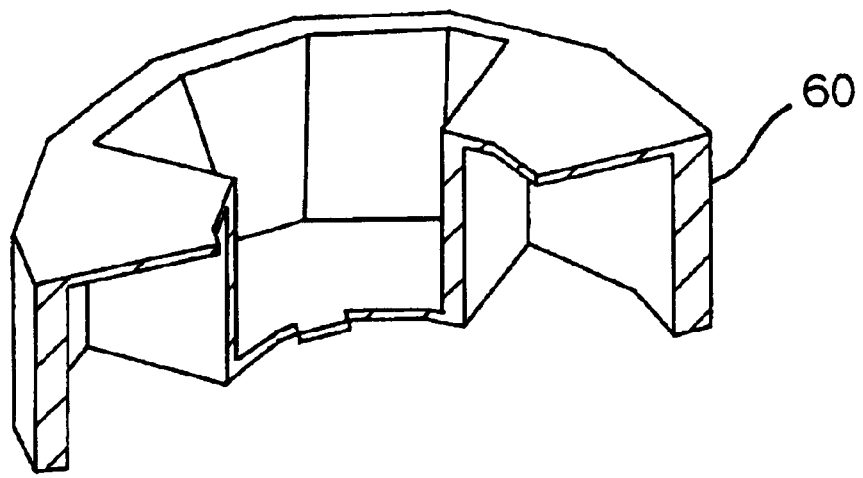
FIGS. 9 and 10 illustrate other forms of the shock absorbers.
Figure 10:
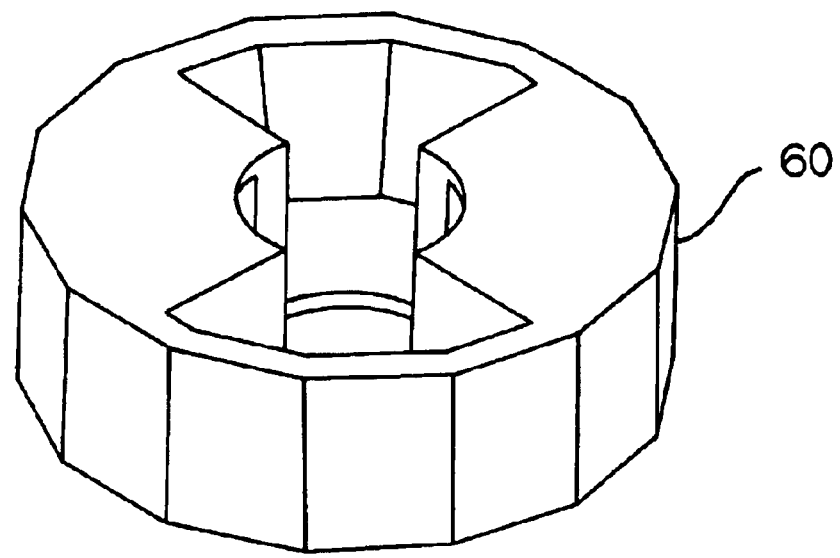

It is to be understood that other forms of shock-absorbing members take other configurations but generally have deformable or crushable walls that are perpendicular to the body pillar, and deform upon a load applied to either the Bolt end of the anchor or as illustrated in an impact in direction of arrow 39A in FIG. 2, or toward the rail components in the direction of arrow 39B of FIG. 2. A variety of crushable shock-absorbing elements may be employed to function as the outer and lower shock-absorbing member, such as shock-absorber 60 illustrated in FIGS. 9 and 10.

Figure 11:
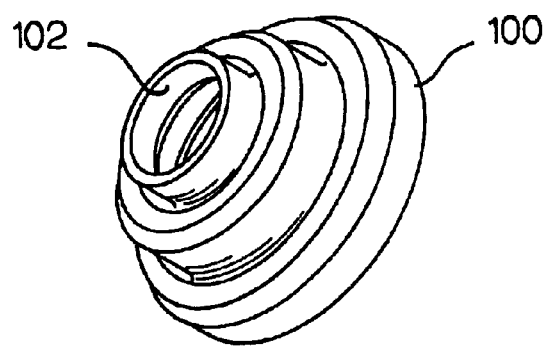
FIGS. 11–13 illustrate a shock absorber using a viscous fluid material.
Figure 12:
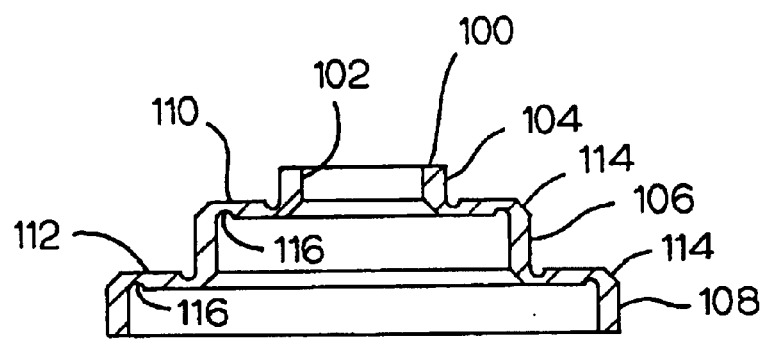
Figure 13:
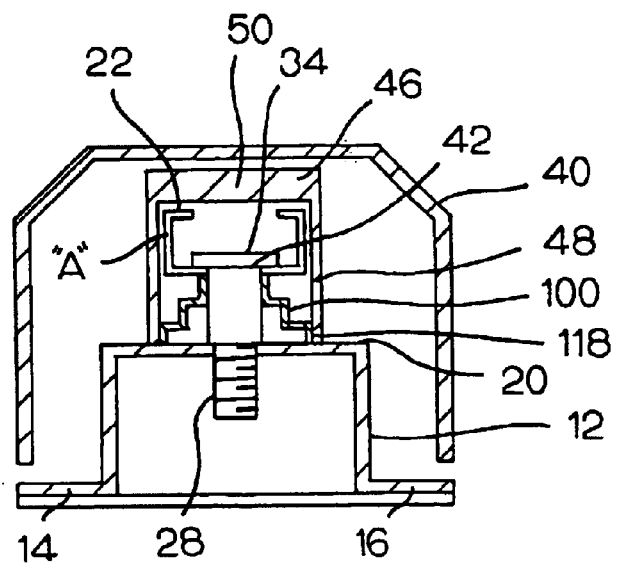

FIGS. 11–13 illustrate another embodiment of the invention in which an inner shock-absorbing member 100 has a hollow, stepped conical configuration. Member 100 has a central opening 102 that fits snugly but slidably around bolt shank 28. Member 100 has an uncollapsed height that fits tightly between the bottom of rail 22 and base wall 20. Member 100 has three cylindrical sections 104, 106 and 108 connected by annular steps 110 and 112 that are parallel to base wall 20. The seams between the steps and the cylindrical sections are beveled as at 114 and thinned on the inside as at 116.

Member 100 is filled with a semi-viscous fluid 118, such as silicon gel, energy-absorbing foam, partly mastic, grease, or an oil and silicon combination, or other similar materials.

A head impact on the bolt will cause member 100 to collapse or rupture in a controlled shock-absorbing manner as the rail moves toward pillar 12.

Having described my invention, I claim:

1. A seat belt anchoring system for a vehicle having a body pillar, comprising:
    an elongated moveable seat belt anchor rail having structure for connecting a seat belt to the rail, the rail having a bolt-receiving opening;
    an elongated anchor member including a shank having a head on one end thereof, and means for connecting the opposite end thereof to the body pillar, the shank being disposed in the bolt-receiving opening of the rail such that the rail is moveable along the shank toward the body pillar, the bolt-receiving opening being smaller in diameter than the head of the shank;
    a first shock-absorbing member disposed between the rail and the body pillar and having a deformable wall; and
    a second shock-absorbing member disposed between the rail and the body pillar and having a deformable wall, the rail being moveable toward the body pillar to initially deform only the deformable wall of the first shock-absorbing member and then to deform the shock-absorbing walls of both of said shock-absorbing members.

2. The seat belt anchoring system as defined in claim 1, in which the rail has a channel-shaped configuration.

3. The seat belt anchoring system as defined in claim 1 including means for mounting the rail in an upright position on the body pillar.

4. The seat belt anchoring system as defined in claim 1, including a pair of elongated anchor members, and in which the rail has a pair of openings for receiving the anchor members so as to be moveable thereon toward the body pillar.

5. The seat belt anchoring system as defined in claim 1, in which the second shock-absorbing member has a deformable shock-absorbing wall generally parallel to the deformable wall of the first shock-absorbing member whereby a moving object contacting the first shock-absorbing member and the rail deforms the shock-absorbing walls of both the first shock-absorbing member and the second shock-absorbing member.

6. The seat belt anchoring system as defined in claim 1, in which the body pillar has a wall perpendicular to the shank of the anchor member, and the first shock-absorbing member has a deformable shock-absorbing wall structure generally perpendicular to the body pillar wall.

7. The seat belt anchoring system as defined in claim 1, in which the body pillar has a wall perpendicular to the length of the shank of the elongated anchor member, and the second shock-absorbing member has a deformable shock-absorbing wall generally perpendicular to the body pillar wall.

8. The seat belt anchoring system as defined in claim 1, in which the fluid is an oil and silicon fluid.

9. The seat belt-anchoring system as defined in claim 1, in which the rail has a channel-shaped configuration.

10. The seat belt-anchoring system as defined in claim 1, in which the first shock-absorbing member has a deformable wall surrounding the shank head.

11. The seat belt-anchoring system as defined in claim 1, in which the second shock-absorbing member has an annular wall disposed between the shank head and the body pillar.

12. The seat belt-anchoring system as defined in claim 11, in which at least one of said shock-absorbing members has a first end and a second end, and the annular wall of said at least one shock-absorbing members has an annular step between said first end and said second end.

13. The seat belt anchoring system as defined in claim 1, in which both the first and the second shock-absorbing members have end edges disposed in a common plane.

14. The seat belt anchoring system as defined in claim 13, in which said end edges are fixed against relative motion with respect to said anchor member.

15. The seat belt-anchoring system as defined in claim 1, in which the first shock-absorbing member (46) has a head (50) movable toward the head of the shank.

16. The seat belt anchoring system as defined in claim 1 in which a viscous fluid is contained within the second shock-absorbing member so as to pass from the second shock-absorbing member as it is being deformed by a moving object.

* * * * *